US008885298B2

(12) United States Patent
Yee et al.

(10) Patent No.: US 8,885,298 B2
(45) Date of Patent: Nov. 11, 2014

(54) CONFERENCE ROLL CALL

(75) Inventors: Dawson Yee, Bellevue, WA (US); Anoop Gupta, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1201 days.

(21) Appl. No.: 11/562,585

(22) Filed: Nov. 22, 2006

(65) Prior Publication Data

US 2008/0117838 A1 May 22, 2008

(51) Int. Cl.
*H04M 3/56* (2006.01)
*H04N 7/15* (2006.01)
*H04L 9/32* (2006.01)

(52) U.S. Cl.
CPC ............. *H04M 3/569* (2013.01); *H04N 7/15* (2013.01); *H04L 9/32* (2013.01); *H04M 2201/38* (2013.01); *H04M 2203/5072* (2013.01); *H04M 2203/5081* (2013.01)
USPC ...... 360/260; 379/142.17; 455/415; 707/203; 709/204

(58) Field of Classification Search
USPC .......................................... 709/204; 370/260
See application file for complete search history.

(56) References Cited

U.S. PATENT DOCUMENTS

| | | | |
|---|---|---|---|
| 5,619,555 A | 4/1997 | Fenton et al. | |
| 6,330,022 B1 * | 12/2001 | Seligmann | 348/14.08 |
| 6,343,299 B1 * | 1/2002 | Huang et al. | 707/638 |
| 6,457,043 B1 | 9/2002 | Kwak et al. | |
| 6,628,767 B1 * | 9/2003 | Wellner et al. | 379/202.01 |
| 6,629,129 B1 * | 9/2003 | Bookspan et al. | 709/204 |
| 6,826,159 B1 | 11/2004 | Shaffer et al. | |
| 7,023,965 B2 | 4/2006 | Oates et al. | |
| 7,130,851 B1 * | 10/2006 | Brown et al. | 1/1 |
| 7,299,257 B2 * | 11/2007 | Boyer et al. | 709/204 |
| 7,317,791 B2 * | 1/2008 | Carlson | 379/202.01 |
| 7,376,129 B2 * | 5/2008 | Acharya et al. | 370/352 |
| 7,483,400 B2 * | 1/2009 | Kuusinen et al. | 370/267 |
| 7,499,969 B1 * | 3/2009 | van Os et al. | 709/203 |
| 2003/0081751 A1 | 5/2003 | Berstis | |
| 2003/0220816 A1 * | 11/2003 | Giesler et al. | 705/2 |
| 2004/0003040 A1 | 1/2004 | Beavers et al. | |
| 2004/0047461 A1 * | 3/2004 | Weisman et al. | 379/202.01 |
| 2004/0205135 A1 * | 10/2004 | Hallam-Baker | 709/206 |
| 2004/0246332 A1 * | 12/2004 | Crouch | 348/14.08 |
| 2005/0062844 A1 | 3/2005 | Ferren et al. | |
| 2005/0099492 A1 * | 5/2005 | Orr | 348/14.08 |
| 2005/0149876 A1 * | 7/2005 | Kortum et al. | 715/753 |

(Continued)

OTHER PUBLICATIONS

Wullert, J.R., Hyong Sop Shim, Mouchtaris, P., Li, S.P., Chiang, C.-Y.J., "Presence management in next generation networks", Proceedings of the SPIE—The International Society for Optical Engineering, Voice over IP (VoIP) Technology, Denver, CO, USA, Aug. 21, 2001, vol. 4522, p. 69-75.*

(Continued)

*Primary Examiner* — Andrew Goldberg
(74) *Attorney, Agent, or Firm* — Andrew Smith; Jim Ross; Micky Minhas

(57) ABSTRACT

A facility is described for providing conference roll calls that identify participants in electronically facilitated conferences. In various embodiments, the facility receives identifiers of participants in an electronically facilitated conference and displays a list of the participants in a roll call. The list can include indications of which participant is speaking, whether participants are authenticated, and other information associated with the participant, such as the participant's name.

20 Claims, 9 Drawing Sheets

(56) References Cited

U.S. PATENT DOCUMENTS

| | | | |
|---|---|---|---|
| 2005/0206721 | A1 | 9/2005 | Bushmitch et al. |
| 2006/0093104 | A1* | 5/2006 | Maytal et al. ............... 379/93.28 |
| 2006/0154653 | A1* | 7/2006 | Wilson .......................... 455/416 |
| 2006/0221897 | A1* | 10/2006 | Nagy et al. .................... 370/329 |
| 2007/0106724 | A1* | 5/2007 | Gorti et al. .................... 709/204 |
| 2007/0206747 | A1* | 9/2007 | Gruchala et al. ......... 379/142.01 |

OTHER PUBLICATIONS

MiYoung Huh, Wook Hyun, JaeChon Han, IlJin Lee, ShinGak Kang, "Design considerations for user authorization in the presence services based on SIP", The 7th International Conference on Advanced Communication Technology, Feb. 23, 2005, vol. 2, p. 1055-8.*

Oasis, Committee Specification Level Documents for the Security Assertion Markup Language (SAML), Apr. 20, 2002, pp. 1-5.*

OASIS, "Committee Specification Level Documents for the Security Assertion Markup Language (SAML)", Apr. 20, 2002, pp. 1-5.*

"Committee Specification Level Documents for the Security Assertion Markup Language (SAML)", Robin Cover, Editor, Cover Pages, pp. 1-5, Apr. 20, 2002.*

Bravo, Jose et al., "Display-based services through identification: An approach in a conference context," Ubiquitous Computing & Ambient Intelligence, Thomson, ISBN: 84-9732-442-0, pp. 3-10.

Gharai, Laden et al., "Large Scale Video Conferencing: A Digital Amphitheater," Mar. 1, 2002, http://www.isi.edu/div7/publication_files/large_scale_video.pdf, [last accessed Feb. 20, 2006].

Srinivas, Kankanahalli et al., "MONET: A Multi-media System for Conferencing and Application Sharing in Distributed Systems," Feb. 1992, http://www.cerc.wvu.edu/cercdocs/techReports/1991/cerc-tr-m-91-009.pdf, [last accessed Feb. 20, 2006].

Yu, George and Herbert Gish, "Identification of Speakers Engaged in Dialog," Proceedings of ICASSP93-2-97, vol. 2, © 1993 IEEE, pp. 383-386.

* cited by examiner

CONFERENCE ROLL CALL

BACKGROUND

To reduce costs or inconvenience associated with travel, people sometimes conference "virtually" by using telephones or other electronic audio/video devices. These electronically facilitated conferences are generally referred to as teleconferences or videoconferences. Participants in teleconferences employ teleconference devices to speak or to hear other participants. Participants in videoconferences employ videoconference devices to (1) speak and be seen and (2) hear and see other participants. People may also employ computing devices, such as personal computers and handheld computers, as well as other devices, such as mobile or conventional telephones, to participate in electronically facilitated conferences. Participants may also use other supporting equipment, such as imaging devices to share documents or projection devices to project an image of participants, such as to enable multimedia conferencing. Electronically facilitated conferencing can be combined with conventional conferencing, such as to enable attendees who are physically present in a conference room to employ electronic equipment to exchange information and communicate with remote attendees who are participating virtually. An electronically facilitated conference can include participants who use different types of equipment, such as computers, mobile phones, conventional telephones, teleconferencing equipment, and videoconferencing equipment.

When an electronically facilitated conference supports different types of equipment, it may require the use of a common protocol so that participants using one device type can communicate with participants using a different device type. As an example, the Session Initiation Protocol (SIP) has become a popular protocol for use in electronically facilitated conferencing. SIP can be used to create, modify, and terminate "sessions" with one or more participants. These sessions can support teleconferencing, videoconferencing, and multimedia conferencing. Another popular protocol for electronically facilitated conferencing is H.323, which is similar to SIP in many respects.

Devices employing SIP can establish sessions with each other by employing an Internet Protocol (IP) network. This network of SIP devices can be called a SIP network. A SIP network comprises entities (e.g., devices or applications that employ SIP) that can participate in a SIP session as a client, a server, or both. SIP supports multiple types of entities, including user agents and routing agents. User agents initiate and terminate sessions by exchanging messages with other SIP entities. A user agent can be a user agent client ("UAC"), which is a device that initiates SIP requests, or a user agent server ("UAS"), which is a device that receives SIP requests and responds to such requests. As examples, IP telephones, personal digital assistants, personal computers, and any other type of computing device can be user agents. A device can be a UAC in one SIP session and a UAS in another, or may change roles during the session. A routing agent, such as a gateway, can connect entities across networks, such as an IP network and a public switched telephone network (PSTN).

SIP supports multiple message types, including requests, which are sent from a UAC to a UAS, and responses, which are sent from a UAS to a UAC when responding to a request. A SIP message can comprise three parts. The first part of a SIP message is a "request line," which includes fields to indicate a message (e.g., INVITE), an identification of the entity or user sending the message, such as a Uniform Resource Identifier (URI), and a request URI that identifies the entity or user to which the request is being directed. The second part of a SIP message comprises headers whose values are represented as name-value pairs. The third part of a SIP message is the message's body, which is used to describe the session to be initiated or which contains data that relates to the session. Message bodies may appear in requests, responses, or other SIP messages.

A protocol that can be used for teleconferencing is Voice over Internet Protocol (VoIP). VoIP can function with both SIP and H.323 to enable participants to exchange VoIP messages that carry, for example, a digitization of their voices in a manner similar to conventional telephones. Applications executing on computing devices can employ VoIP, as can devices that are designed to employ VoIP. Examples of VoIP devices include VoIP telephones and VoIP teleconferencing equipment. These devices may contain hardware and software (e.g., embedded in integrated circuits) that enable the devices to connect directly to an IP network instead of, or in addition to, a PSTN that conventional telephones employ. Participants in VoIP conversations can employ various types of devices, including VoIP devices, conventional devices, and so forth, to participate in an electronically facilitated conference by calling other participants or responding to calls from other participants. In the following discussion, a participant that initiates a call is termed a "caller" whereas a participant that receives the call is termed a "callee."

When many people participate in a conference, it can be difficult to determine who the participants are and who is presently speaking. Even if speakers identify themselves, other listeners who have not previously heard a speaker's voice may be unable to ascertain whether speakers are really who they claim to be. Moreover, when some participants' devices transmit distracting background noises, such as barking dogs, crying children, or noisy traffic, it can be difficult for other participants to hear the speaker clearly.

SUMMARY

A facility is described for providing conference roll calls that identify participants in electronically facilitated conferences. When a caller invites a callee to an electronically facilitated conference, the caller's device can store a list of all invited callees and provide the list to the callees who join the conference. Alternatively, a multipoint control unit (MCU) that provides services to an electronically facilitated conference can receive identities of the caller and callees (participants), store a list of the participants, and provide the list of participants to the participants. When additional callees join the conference, the caller's device, a callee's device, or the MCU (hereinafter, "roll attendant") can notify participants' devices that the additional callee has joined the conference. The participants' devices can then display a roll call that lists all participants in the conference. When a participant departs the conference, such as by hanging up, the roll attendant can notify all remaining participants of the departure so that they can remove the departing participant from the roll call they display. A roll attendant can provide other properties relating to participants in the roll call. These properties can include indications of the current speaker, whether participants are authenticated, additional information about participants, and so forth. Participants may also take various actions based on these properties, such as mute participants to eliminate background noise or decide not to discuss a confidential topic when not everyone who appears in the roll call is identified as authenticated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
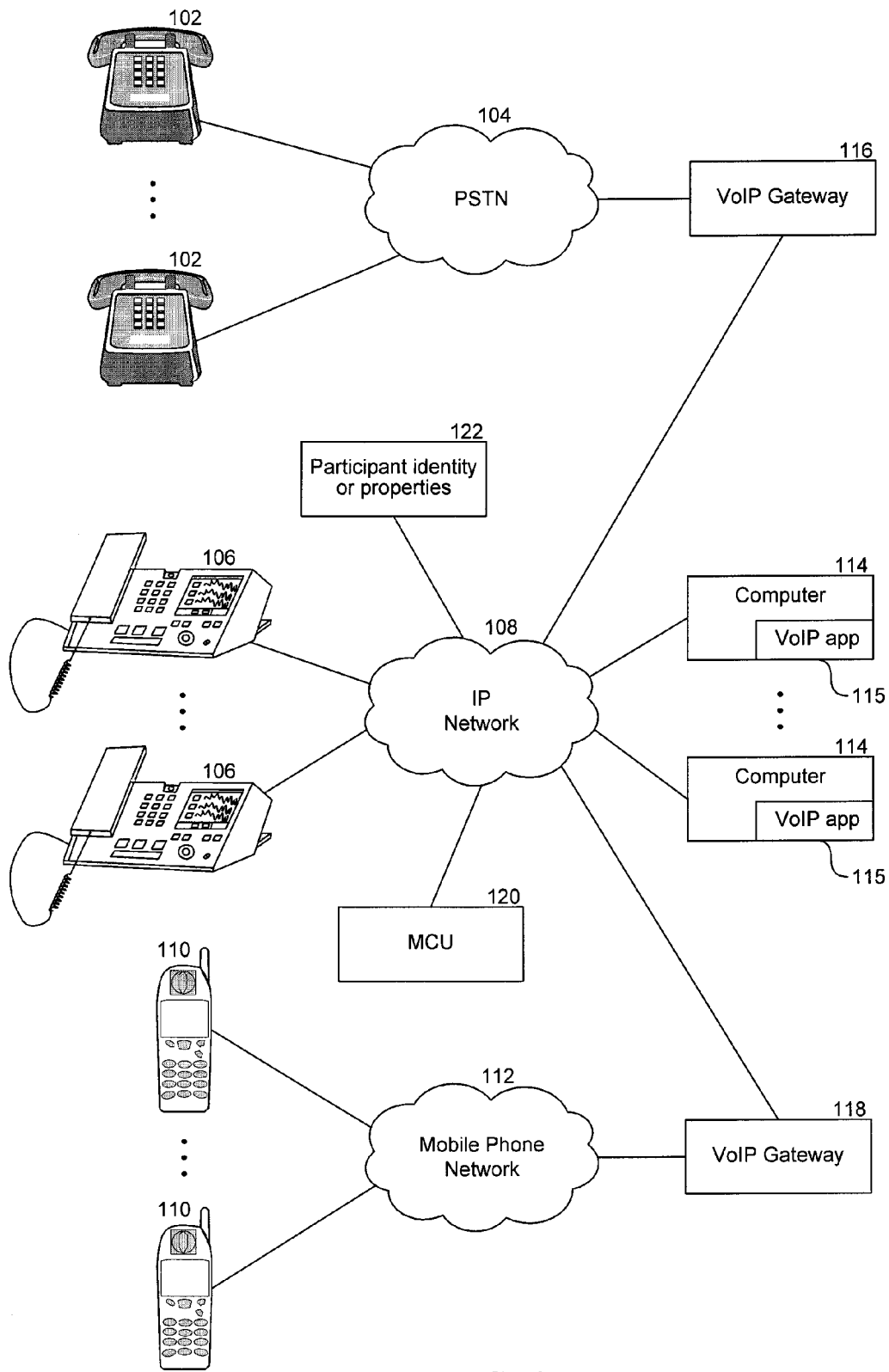
FIG. 1 is a block diagram illustrating an environment in which aspects of the disclosed technology may operate in various embodiments.

A facility is described for providing conference roll calls that identify participants in electronically facilitated conferences. When a caller invites a callee to an electronically facilitated conference, such as by sending an invitation message to a URI associated with the callee or dialing the callee's device, the caller's device can store a list of all invited callees and provide the list to the callees who join the conference. Alternatively, an MCU that provides services to an electronically facilitated conference can receive identities of the caller and callees (participants), store a list of the participants, and provide the list of participants to the participants. When additional callees join the conference, the caller's device, a callee's device, or the MCU (hereinafter, "roll attendant") can notify all participants' devices that the additional callee has joined the conference. The participants' devices can then display a roll call that lists all participants in the conference. When a participant departs the conference, such as by hanging up, the roll attendant can notify all remaining participants of the departure so that they can remove the departing participant from the roll call they display. A roll attendant can provide other properties relating to participants in the roll call. These properties can include indications of the current speaker, whether participants are authenticated, additional information about participants, and so forth. These properties are described in further detail immediately below.

In some embodiments, a roll attendant can dynamically detect who the current speaker is and identify the current speaker in the roll call. In general, VoIP devices send messages containing audio information only when they detect audio. When a user of a VoIP device is not speaking, the VoIP device does not send any messages. However, when a VoIP device picks up loud background noises, the VoIP device may send messages containing the background noise. Other devices, such as conventional telephones and mobile phones, also tend to transmit background noises. As an example, participants in conversations may need to remind participants to mute their phone when the participants are typing during a conference or calling from a moving vehicle because these background noises can be distracting. A roll attendant can employ various techniques to detect which speaker is speaking, such as by analyzing the signal level coming from the participants, the number or frequency of messages coming from the participants, so forth. Employing signal processing to distinguish voice from background noise is known in the art. Upon identifying which participant is currently speaking, the roll attendant can identify the current speaker in a message to all participants. The VoIP devices that display the roll call can then identify the current speaker, such as by displaying an icon near the current speaker's name on the roll call. In some embodiments, each participant's VoIP device can make this determination.

In some embodiments, a roll attendant can provide authentication information relating to participants. Some devices require users to authenticate themselves before being able to employ an application, such as a VoIP application. As an example, personal computers, handheld computers, and even some VoIP telephones can require users to authenticate. Authentication of a user includes receiving an identity for the user and some secret information, such as a password. When a device authenticates a user, the VoIP application executing on that device may indicate to other VoIP applications on other devices that the user is an authenticated participant. As an example, the VoIP application may indicate in a message that it has authenticated the participant. The VoIP application may also provide secret information (e.g., a verifiable digital signature) so that a malicious participant cannot send a message to other participants indicating that the malicious participant has been authenticated. When a VoIP application receives an indication that a participant has been authenticated, it may verify the indicated secret (e.g., by verifying the digital certificate the message contains) and display an indication on the roll call it displays that the participant has been authenticated. As an example, the VoIP application may display an icon next to each participant's identifier when that user is authenticated.

In some embodiments, a roll attendant can provide additional information about participants. The roll call participant can retrieve information about participants from a database and provide the information to other participants. This additional information can include, e.g., the participant's name, telephone number, office location, time zone, etc. The roll attendant or VoIP application can retrieve this information from a server that stores this information, such as MICROSOFT EXCHANGE, by employing an application program interface (API) provided by the server. The API may require an indication of the participant about whom information is requested. This indication of the participant can be the URI of the participant that is provided in SIP messages to or from the participant's computing device. This URI may also be listed in the roll call. The VoIP application may employ the API provided by an address book provider component associated with the server to retrieve the information relating to a participant.

In various embodiments, an electronically facilitated conference can have several roll attendants. The roll attendants can provide duplicate services for the conference or may divide responsibility. As an example, the caller's device may maintain the roll call, but an MCU may identify the current speaker.

In various embodiments, a roll attendant can track information not only about participants employing VoIP or SIP, but also participants employing other device types. As an example, a roll attendant may receive and track "caller ID" or other information that conventional or mobile phones provide. The roll attendant can receive the caller ID information from a gateway device that enables these conventional devices to connect to a SIP network and include this received information in SIP messages to participants. The roll attendant may also look up other information based on the caller ID. As an example, the roll attendant may look up and provide the time zone in which the area code of the telephone is located or the geographic area in which a mobile phone is located. As another example, the roll attendant may look up information online based on the name or telephone number indicated in the caller ID information and provide this information to participants.

In various embodiments, the roll attendant may also be able to provide a roll call to conventional devices, such as by sending caller ID information indicating each attendee's identity or telephone number. Conventional devices may display this information in their caller ID display.

Thus, the roll attendant can enable participants to view information from one or more sources about participants in a conference. Participants may also take various actions based on this information. As an example, a participant can easily determine from the roll call who the current speaker is and mute other participants to eliminate background noise. As another example, a participant may mute all other participants or participants that are known to be calling in from a noisy environment. The participant may also take various actions based on the authenticated identity of a speaker. As an example, the participant may decide not to discuss a confidential topic when not everyone who appears in the roll call is identified as authenticated.

Several embodiments of the facility are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement the technology. In addition, the data structures and message structures may be stored or transmitted via a data transmission medium, such as a signal on a communications link. Various communications links may be used, such as the Internet, a local area network, a wide area network, or a point-to-point dial-up connection.

FIG. 1 is a block diagram illustrating an environment in which aspects of the disclosed technology may operate in various embodiments. The environment can include conventional telephones 102 that are connected to a PSTN network 104. A participant can join an electronically facilitated conference via a conventional (e.g., PSTN) telephone 102. Alternatively, a participant may employ a VoIP device, such as a VoIP telephone 106. To participate in an electronically facilitated conference, participants can employ other VoIP devices, such as a computing device 114 that executes a VoIP application 115. VoIP phones or computing devices can connect to each other via a network, such as an IP network 108 or the Internet. Participants can also employ mobile phones 110, such as cellular telephones, that connect via a mobile phone network 112. Devices connected to the PSTN network 104 may communicate with devices connected to the IP network 108 via a VoIP gateway 116. The VoIP gateway 116 may be a SIP routing agent that translates messages between message types employed by IP and PSTN networks or devices. Similarly, devices connected to the mobile phone network 112 may communicate with devices connected to the IP network 108 via a VoIP gateway 118. When a participant employs a PSTN or mobile phone, VoIP gateways 116 and 118 may provide the telephone numbers of the participant, such as in a SIP header field or VoIP header field that would normally indicate a URI associated with the participant. These telephone numbers may be provided in addition to a URI associated with the gateway. The environment may also include an MCU 120 that is connected to the IP network 108. The MCU 120 can perform a number of activities, including mixing or selecting audio or video information, identifying a current speaker, providing information relating to participants, and so forth. As an example, the MCU can receive messages containing digitized audio signals (e.g., voice signals) from multiple participants, combine them, and forward messages containing the combined audio signals to the participants. The environment may also include a server 122 that provides identities or other properties relating to participants, such as MICROSOFT EXCHANGE.

In various embodiments, additional components can be used to facilitate electronic conferences or some of these components may not be used.

Figure 2:
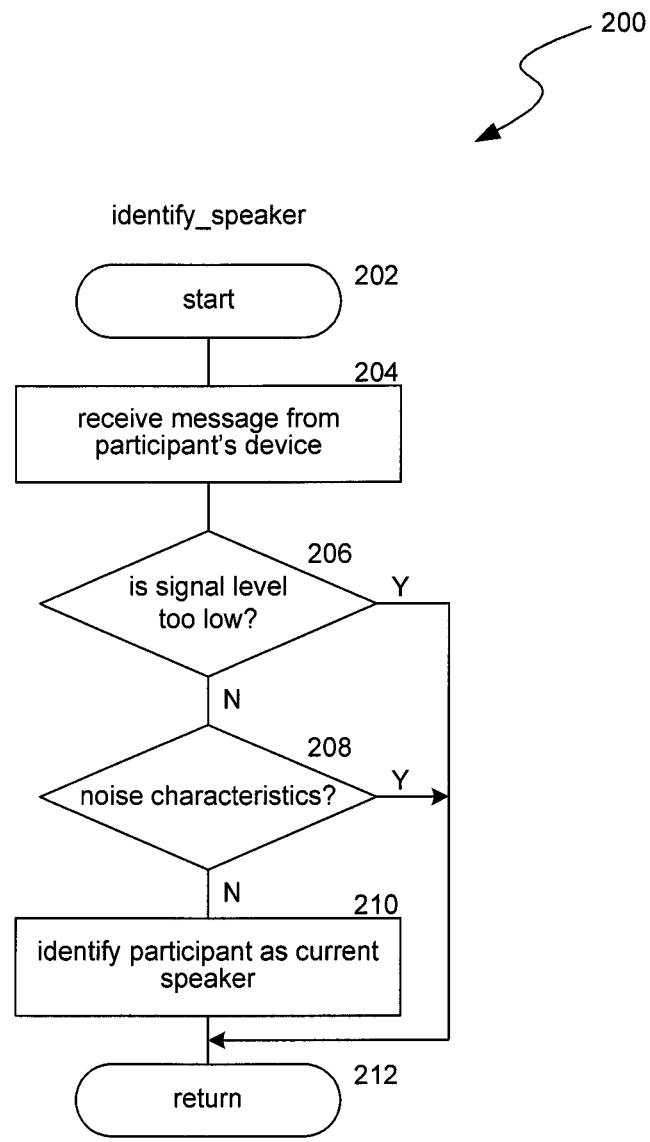
FIG. 2 is a flow diagram illustrating an identify_speaker routine invoked by a roll attendant in some embodiments.

FIG. 2 is a flow diagram illustrating an identify_speaker routine 200 invoked by a roll attendant in some embodiments. A roll attendant can invoke the routine to identify a current speaker. The routine begins at block 202.

At block 204, the routine receives a message from an endpoint, such as from a caller's device or a callee's device. The received message may be received in a VoIP message, and may contain digitized voice or other sound information. As an example, the digitized voice or sound information may be stored in a body portion of the received message. The received message may be in any protocol that is compatible with the environment and that can carry digitized voice or sound information in messages.

At decision block 206, the routine determines whether the voice or sound that was digitized and stored in the message indicates that the signal level is below a specified threshold. As an example, the routine may use various signal processing techniques to determine whether the amplitude of the signal is sufficiently high. If the signal level is too low, the routine continues at block 212, where it returns. Otherwise, the routine continues at block 208.

At decision block 208, the routine analyzes the characteristics of the sounds that have been digitized and stored in the received message. If the sounds indicate that they are noise as opposed to voice, the routine continues at block 212 where it returns. Otherwise, the routine continues at block 210. The routine may employ various signal processing techniques to distinguish noises from voices. As an example, the routine may perform a signal-to-noise evaluation. If the routine detects that the noise is a background static noise, the routine may not identify the participant from whom the message was received as the current speaker.

At block 210, because the sounds in the received message did not have a signal level that was too low and were not classified as noises, the routine identifies the participant or the endpoint from whom the message was received as the current speaker. The routine then continues to block 212, where it returns.

Those skilled in the art will appreciate that the logic illustrated in FIG. 2 and described above, and in each of the flow diagrams discussed below, may be altered in a variety of ways. For example, the order of the logic may be rearranged, substeps may be performed in parallel, illustrated logic may be omitted, other logic may be included, etc.

Figure 3:
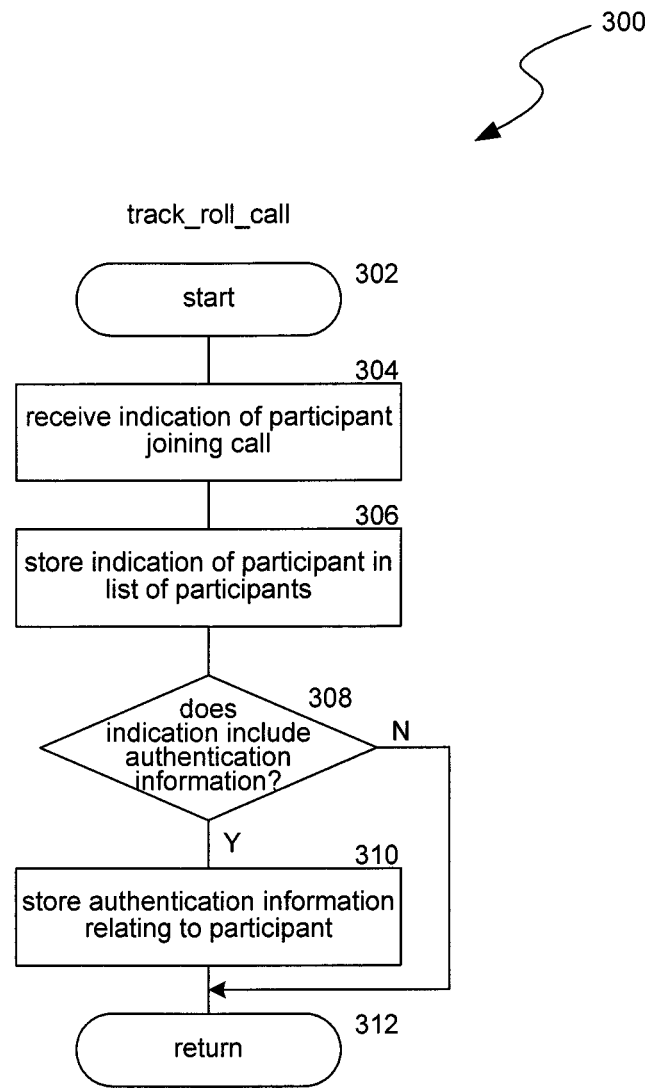
FIG. 3 is a flow diagram illustrating a track_roll_call routine invoked by a roll attendant in some embodiments.

FIG. 3 is a flow diagram illustrating a track_roll_call routine 300 invoked by a roll attendant in some embodiments.

The roll attendant invokes the routine to track the participants, such as in a list of participants. The routine begins at block 302.

At block 304, the routine receives an indication of a participant who is joining the call. As an example, the routine may receive a response to a SIP invitation message indicating that the invited participant is joining the conference. The indication can include a URI for the participant who is joining the conference. Alternatively, the received indication may identify a telephone number associated with the participant who is joining the conversation.

At block 306, the routine stores the received indication in a list of participants. As an example, the routine may store the URI of the joining participant in the list of participants. Alternatively, the routine may store an indication of the joining participant's telephone number in the list of participants. The list of participants may be stored in a memory associated with the roll attendant that invokes the routine.

At decision block 308, the routine determines whether the received indication includes authentication information relating to the participant who is joining the conversation. As an example, the roll attendant may receive a message indicating that the participant who is joining the conversation has been authenticated. If that is the case, the routine continues at block 310. Otherwise, the routine continues at block 312, where it returns.

At block 310, the routine stores an indication that the joining participant has been authenticated and associates the indication with the joining participant's entry in the list of participants. As an example, the routine may store a flag or other indicator in association with the participant's entry in the list of participants.

At block 312, the routine returns.

Figure 4:
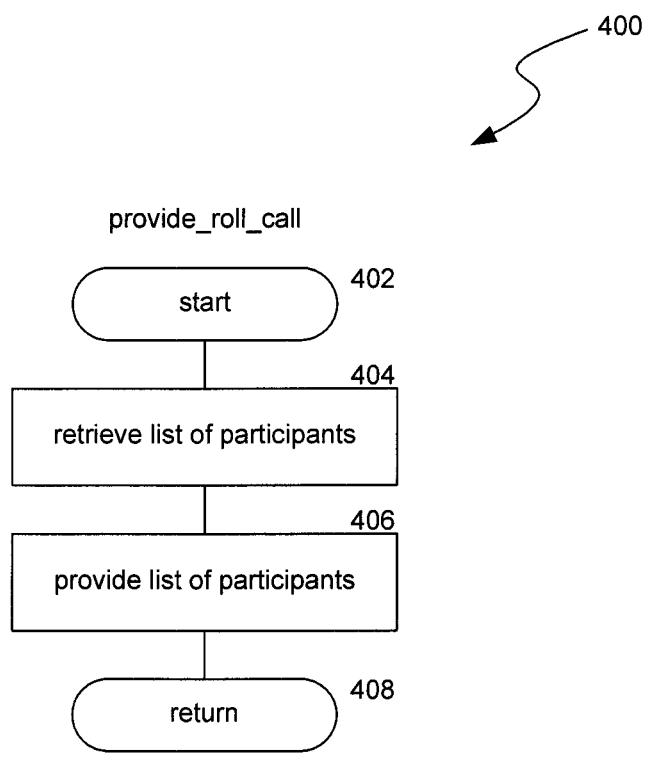
FIG. 4 is a flow diagram illustrating a provide_roll_call routine invoked by a roll attendant in some embodiments.

FIG. 4 is a flow diagram illustrating a provide_roll_call routine 400 invoked by a roll attendant in some embodiments. The roll attendant can invoke the routine, such as when displaying a roll call or providing a list of participants to a participant's device. The routine begins at block 402. At block 404, the routine retrieves the list of participants that has been previously stored, such as in a memory associated with the roll attendant. At block 406, the routine provides the list of participants, such as to a routine that will display a roll call in a display unit or to a participant's device. The routine returns at block 408. In various embodiments, the routine may retrieve the list of participants from a memory associated with the roll attendant. Alternatively, the routine may retrieve the list of participants from another device, such as another roll attendant or participant's device.

Figure 5:
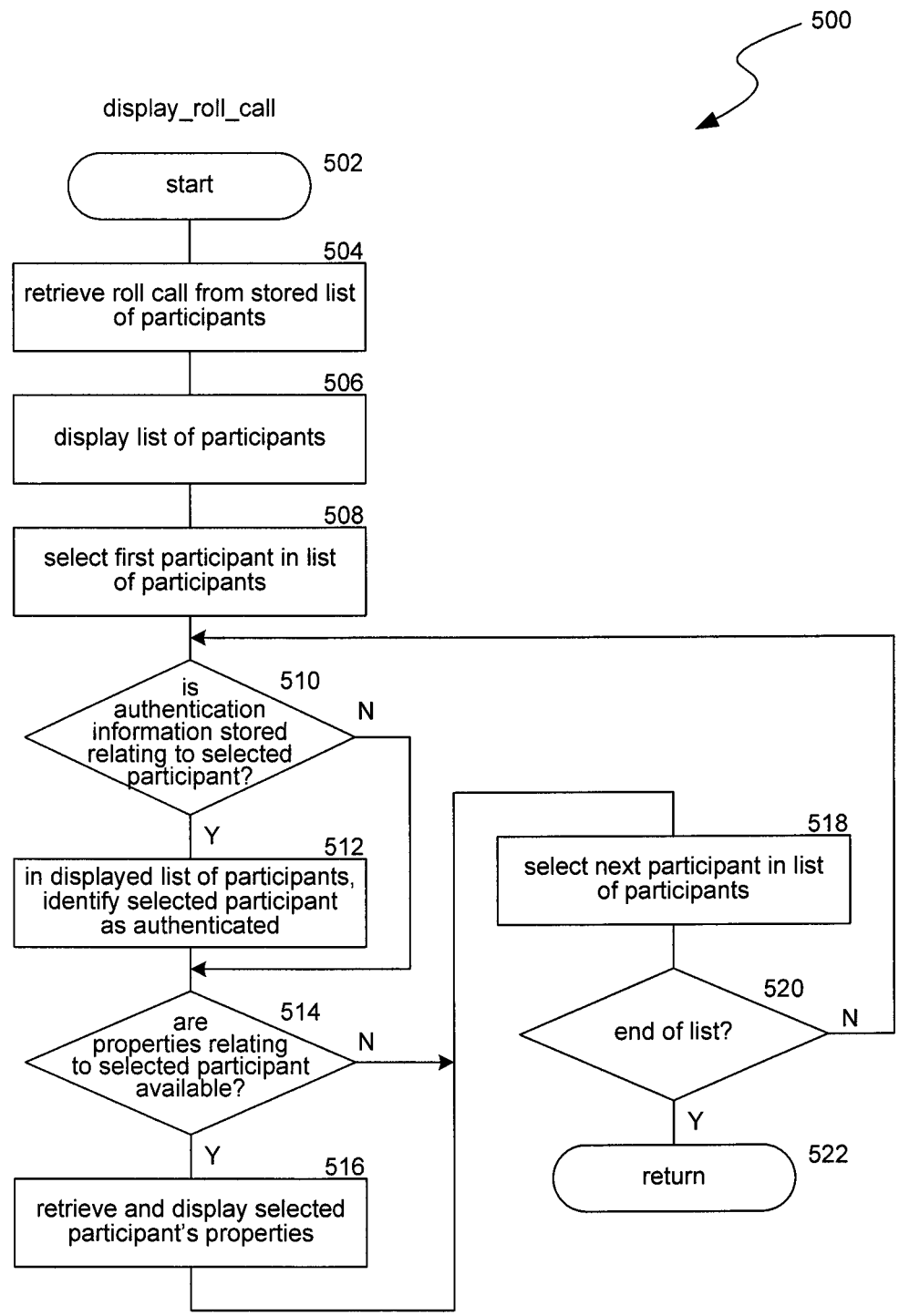
FIG. 5 is a flow diagram illustrating a display_roll_call routine invoked by a roll attendant in some embodiments.

FIG. 5 is a flow diagram illustrating a display_roll_call routine 500 invoked by a roll attendant in some embodiments. A roll attendant may invoke the routine when displaying a roll call. As an example, a participant's computing device or VoIP telephone may invoke the routine to display a roll call in a display unit. The routine begins at block 502.

At block 504, the routine retrieves a roll call from a stored list of participants. As an example, the routine may retrieve a roll call by enumerating the participants in the previously stored list of participants.

At block 506, the routine displays the list of participants, such as in a display unit associated with the device that invokes the routine. Alternatively, the routine may display the list of participants in a user interface of a VoIP application.

Between the logic of blocks 508 to 520, the routine processes each participant listed in the list of participants. At block 508, the routine selects the first participant in the list of participants.

At decision block 510, the routine determines whether authentication information is stored relating to the selected participant. If authentication information is stored, the routine continues at block 512. Otherwise, the routine continues at block 514.

At block 512, the routine updates the displayed list of participants by indicating that the selected participant has been authenticated. As an example, the routine may add an icon or otherwise distinguish the selected participant from other participants who are not authenticated. In various embodiments, the routine may change the formatting of the participant's identification, such as by changing the color or font weight used to display the participant's identification.

At decision block 514, the routine determines whether other properties associated with the selected participant are stored in the list of participants or available from another location. If that is the case, the routine continues at block 516. Otherwise, the routine continues at block 518.

At block 516, the routine retrieves and displays the additional information. Examples of additional information include the participant's name, location, time zone, and so forth. The routine may retrieve this information either from the list of participants or from another location, such as from another server. Alternatively, the routine may retrieve this information by employing an API associated with the component that stores this information, such as an address book API.

At block 518, the routine selects another participant from the list of participants.

If at decision block 520 the routine determines that there are no more participants to be selected, the routine continues at block 522. Otherwise, the routine continues processing the selected participant at block 510.

At block 522, the routine returns.

Figure 6:
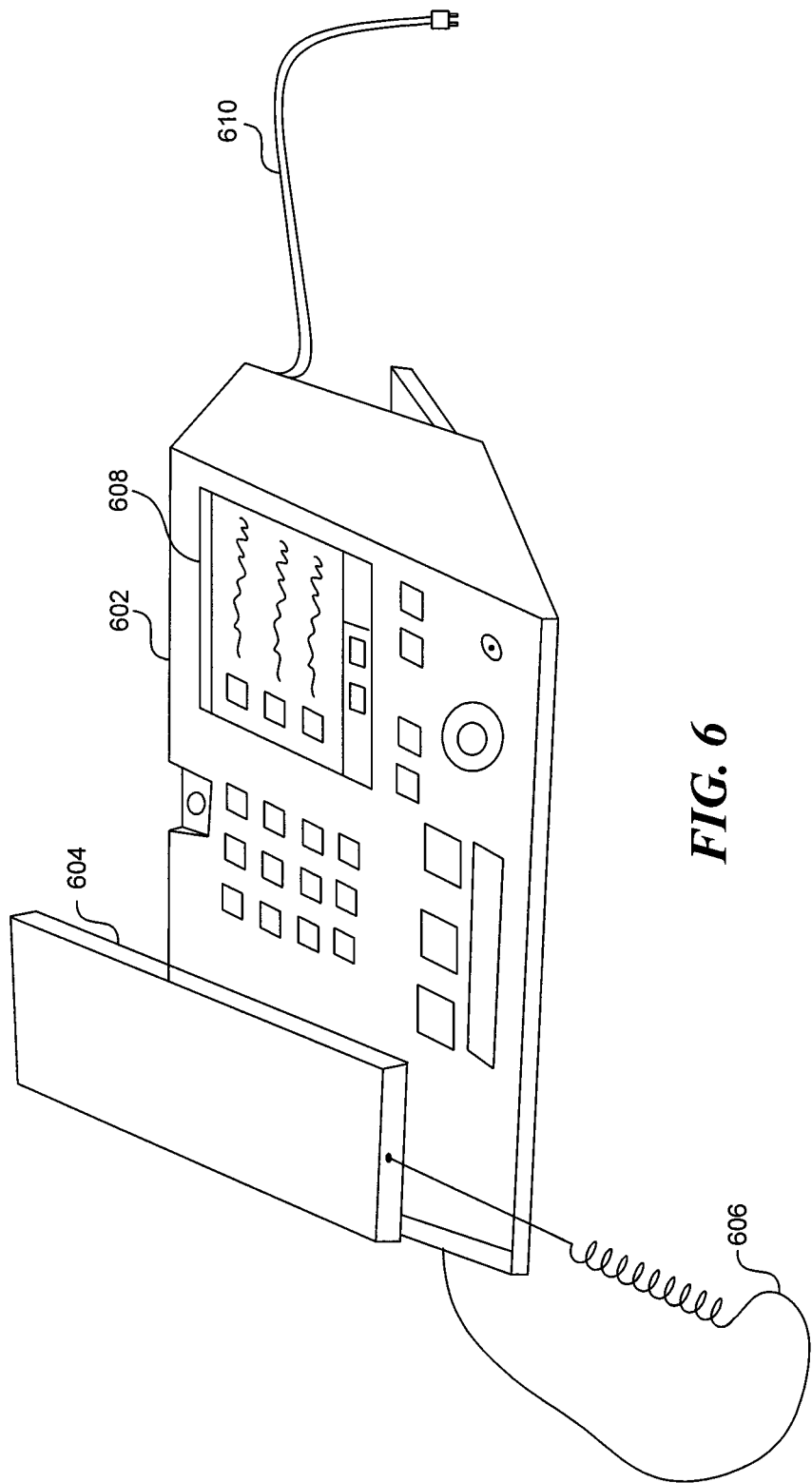
FIG. 6 is an isometric view depicting an arrangement of a communications device 602 in accordance with an embodiment.

FIG. 6 is an isometric view depicting an arrangement of a communications device 602 in accordance with an embodiment. The communications device 602 can be a VoIP telephone that comprises a handset 604 communicably coupled to the communications device via a wire 606 or other link. The communications device 602 can connect to a communications network or computing device (not illustrated) via a communications cable 610. Accordingly, the communications device 602 can provide telephone services, such as by using VoIP, or other link, such as a wireless link (not illustrated). The communications device can have a display unit 608. The display unit can be an LCD display, CRT display, or any other type of display. The display unit can provide a user interface associated with the communications device, such as to provide options. In some embodiments, the display unit may be a touchscreen that is adapted to receive user input via the display, such as when a user touches a region of the screen. The display unit can also provide a roll call, as is illustrated in FIG. 7 and described immediately below.

Figure 7:
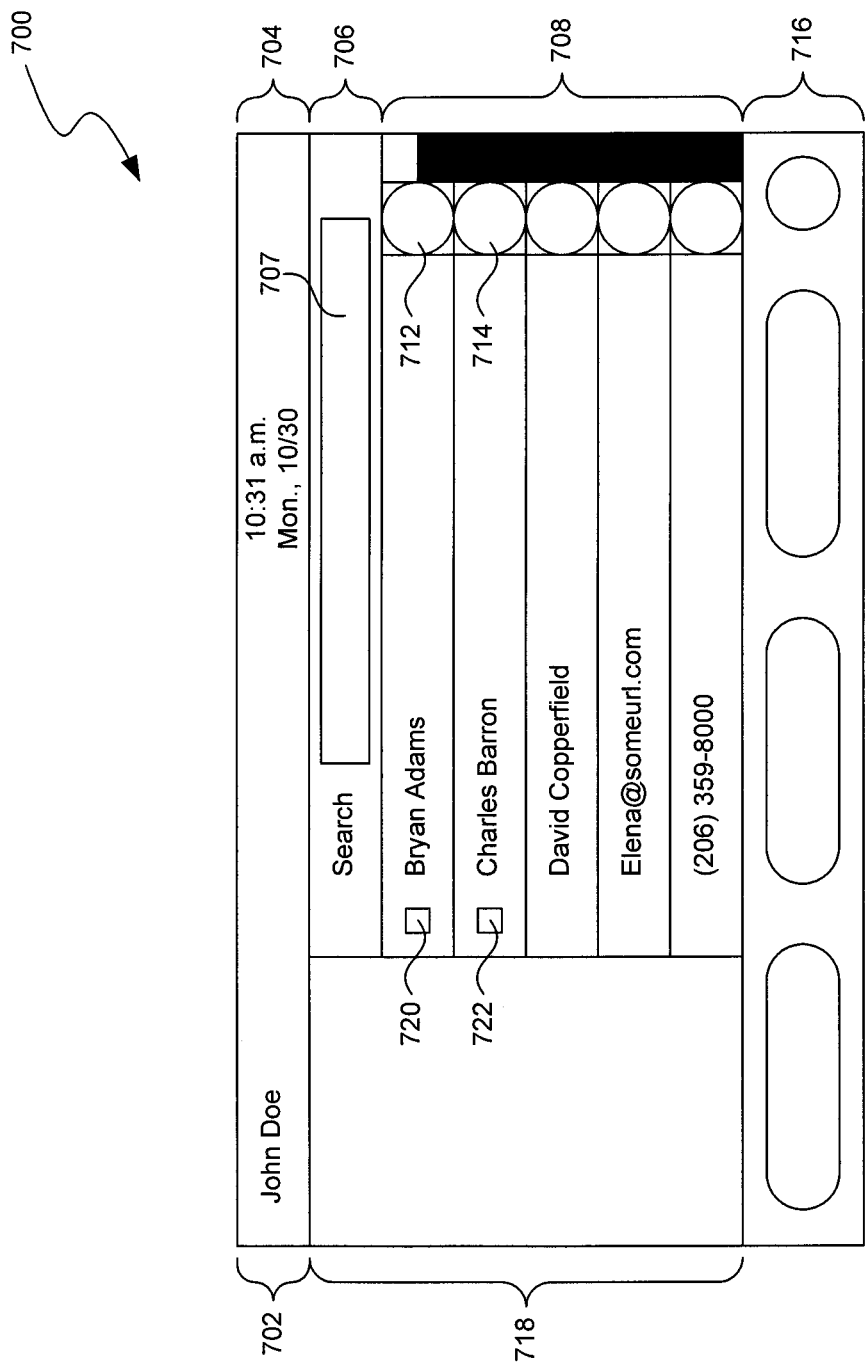
FIG. 7 is a user interface diagram illustrating a representation of a roll call in some embodiments.

FIG. 7 is a user interface diagram illustrating a representation of a roll call in some embodiments. The user interface 700 can be displayed in a display device associated with a communications device, such as in a display unit 608. The user interface can also be displayed on other display devices, such as on a monitor connected to a computing device that executes a VoIP application. The user interface can have various regions, such as an identity region 702 for displaying the name or other identity of a participant using the communications device or computing device and a date region 704 for displaying the current date and time. The user interface can also have a search region 706 that the participant can employ to locate potential participants, such as by typing in a potential participant's name in a search text edit region 707.

The user interface can also provide a roll call in a roll call region 708. The roll call region can provide a list of identifiers associated with participants, such as names (e.g., Bryan Adams, Charles Barron, and David Copperfield), URIs (e.g., Elena@someurl.com), or telephone numbers (e.g., (206) 359-8000). The roll call can also display other information, such as in icons 720, 722, 712, and 714. These icons can provide information about the corresponding participants. As examples, icons 720 and 722 may indicate that the corresponding participants (e.g., Bryan Adams and Charles Barron) have been authenticated. Icon 712 may indicate that the corresponding participant (e.g., Bryan Adams) is currently speaking. Icon 714 may indicate information about the corresponding participant (e.g., Charles Barron), such as the type of device that participant is using (e.g., telephone, mobile phone, computing device, VoIP telephone, etc.), the participant's status (e.g., available for speaking, on mute, etc.), and so forth. The user interface may also have regions 716 and 718 for providing additional functionality that facilitates the conference or activates features of the communications device.

Figure 8:
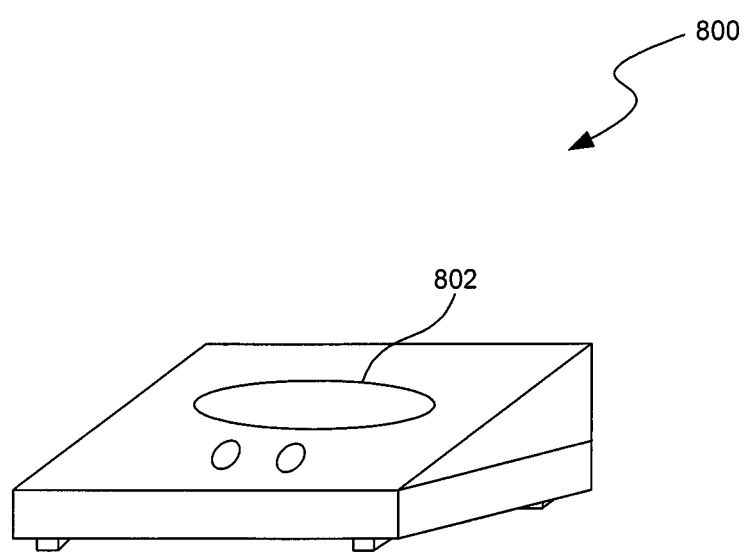
FIG. 8 is an isometric view of a caller ID display in accordance with an embodiment.

FIG. 8 is an isometric view of a caller ID display in accordance with an embodiment. The caller ID device 800 can include a display 802 that lists names, telephone numbers, and so forth. In some embodiments, the caller ID device may display names, URIs, or other information provided by a roll attendant. As an example, a gateway may translate information provided by a roll attendant into a signal that the caller ID device recognizes and translates into textual or graphical information that the caller ID device displays. Thus, a roll call can be provided on a caller ID device in some embodiments. In various embodiments, functionality provided by the caller ID device can be integrated into a telephone, such as a conventional PSTN telephone or mobile phone. The functionality can also be integrated into other devices, such as a VoIP telephone, computing device, and so forth.

Figure 9:
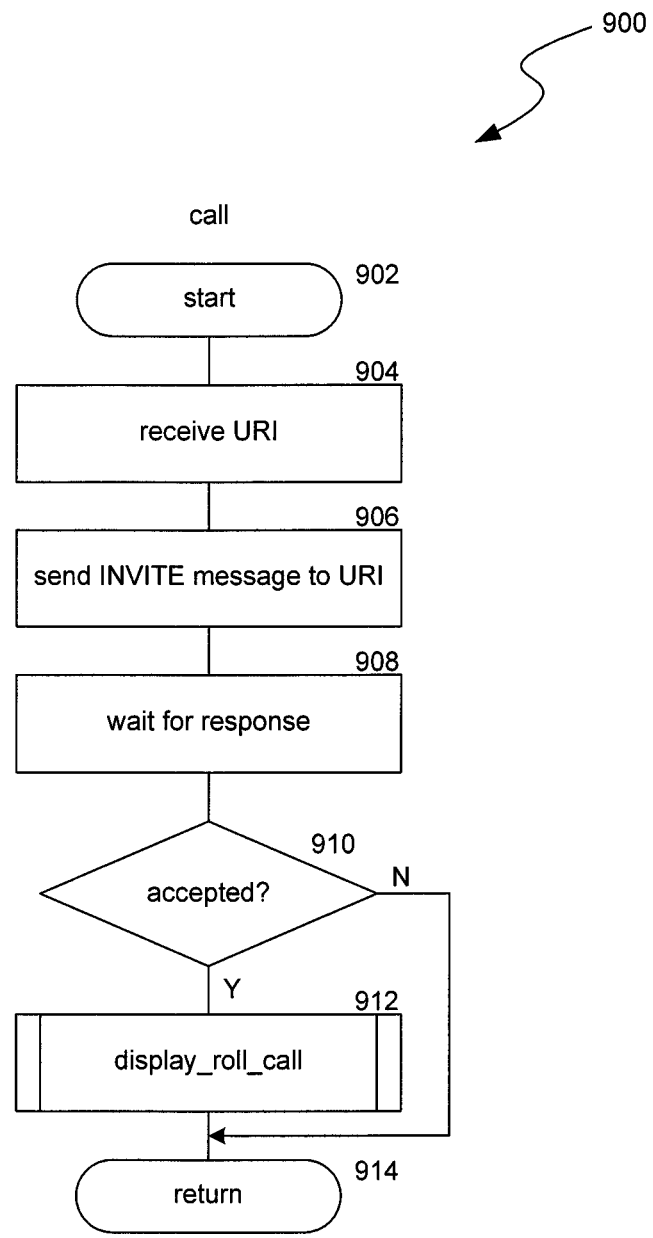
FIG. 9 is a flow diagram illustrating a call routine invoked by a participant's device in various embodiments.

FIG. 9 is a flow diagram illustrating a call routine 900 invoked by a participant's device in various embodiments. A participant's device can invoke the routine when the participant adds another potential participant to the conference, such as by initiating a VoIP call. A device can initiate a VoIP call by sending a SIP INVITE request identifying the address (e.g., telephone number or IP address) of the callee that is to be called. When the callee's device receives the invitation, it can notify the callee of the invitation and send a SIP SESSION-IN-PROGRESS message to the device that sent the invitation. When the callee answers, the callee's device can respond to the INVITE request with a SIP 200 OK message to establish the session. The conversation between the caller and the callee can then be transmitted in VoIP messages. When one of the participants terminates the call, such as by hanging up, that participant's device sends a SIP BYE request to the other participant's device to terminate the call. A caller can connect multiple callees to a conference by establishing a SIP session with each callee. Some VoIP applications may enable callees to add additional people to the conference by establishing SIP sessions with these additional people.

The routine begins at block 902.

At block 904, the routine receives an identifier for the potential participant. Examples of identifiers include, e.g., URIs, telephone numbers, IP addresses, and so forth.

At block 906, the routine sends an invitation to the identified potential participant. As an example, the routine sends a SIP INVITE message to the URI.

At block 908, the routine waits for a response from the potential participant. In some embodiments, the routine may time out and either send another invitation or terminate, such as by continuing at block 914.

At decision block 910, the routine determines whether the invitation was accepted. As an example, the routine may analyze a response SIP message to determine whether the invitation was accepted. When a response indicates that the invitation was accepted, the track_roll_call routine described above in relation to FIG. 3 may be invoked to add the participant to the list of participants. If the invitation was accepted, the routine continues at block 912. Otherwise, the routine continues at block 914, where it returns.

At block 912, the routine invokes a display_roll_call routine to display the roll call. The display_roll_call routine was described above in relation to FIG. 5.

At block 914, the routine returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A computer-implemented method performed by a computing system for providing conference roll calls for an electronically facilitated conference, the method comprising:

receiving, by a first computerized roll attendant, indications of a first participant and a second participant participating in the electronically facilitated conference;

storing, by the first computerized roll attendant, the received indications of the first participant and the second participant in a first list of conference participants, wherein the first list of conference participants comprises a first roll call for the electronically facilitated conference;

receiving by a second computerized roll attendant, indications of the first participant and the second participant participating in the electronically facilitated conference, wherein the second computerized roll attendant is different than the first computerized roll attendant;

storing, by the second computerized roll attendant, the received indications of the first participant and the second participant in a second list of conference participants, wherein the second list of conference participants comprises a second roll call for the electronically facilitated conference, and wherein the second list of conference participants available for retrieval by the first computerized roll attendant;

providing, by the first computerized roll attendant, the first roll call to the first participant;

providing, by the second computerized roll attendant, the second roll call to the second participant;

dynamically detecting that the first participant is speaking;

receiving a verifiable digital signature associated with the first participant;

authenticating the first participant based on the received verifiable digital signature and the first uniform resource identifier; and displaying the second roll call to the second participant, the display indicating identifiers for the first and second participants and an indication that the first participant is speaking, and further wherein displaying the second roll call includes displaying a first graphical indication and a second graphical indication, wherein the first graphical indication is displayed on the second roll call near the first participant identifier to indicate that the first participant has been authenticated, and wherein the second graphical indication is displayed on the second roll call near a second participant identifier to indicate that the second participant has been authenticated;

receiving a message with an indication of a third participant joining the electronically facilitated conference;

updating, by the first computerized roll attendant, the first roll call to add the third participant;

updating, by the second computerized roll attendant, the second roll call to add the third participant;

notifying, by the first computerized roll attendant, the first and second participants that the third participant has joined the electronically facilitated conference;

receiving an indication of the third participant departing the electronically facilitated conference; and notifying, by the first computerized roll attendant, the first and second participants that the third participant has departed the electronically facilitated conference.

2. The computer-implemented method of claim 1, further comprising receiving a message indicating that the first participant is authenticated and displaying in the displayed second roll call an indication that the first participant is authenticated.

3. The computer-implemented method of claim 1, further comprising retrieving information associated with the first participant and displaying in the displayed second roll call the retrieved information.

4. The computer-implemented method of claim 3, such that the retrieving includes employing an application program interface provided by an address book provider to retrieve the first participant's name.

5. The computer-implemented method of claim 1, further comprising receiving from the first participant a verifiable digital signature and authenticating the first participant based on the identifier for the first participant and the received verifiable digital signature.

6. The computer-implemented method of claim 5, further comprising sending a message to the second participant indicating that the first participant is authenticated.

7. A computer-readable storage device the device storing computer-executable instructions for performing a method of providing a conference roll call for an electronically facilitated conference, the method comprising:

receiving, from a first participant, a second uniform resource identifier of a second participant, the first participant associated with a first uniform resource identifier;

sending to a location associated with the second uniform resource identifier a message inviting the second participant to the electronically facilitated conference;

upon receiving an acceptance to the invitation from the second participant, providing, by a first computerized roll attendant, a first roll call for the electronically facilitated conference, wherein the first roll call lists the first and second uniform resource identifiers;

receiving a first verifiable digital signature associated with the first participant;

authenticating the first participant based on the first verifiable digital signature and the first uniform resource identifier;

receiving a verifiable digital signature associated with second participant;

authenticating the second participant based on the second verifiable digital signature and the second uniform resource identifier;

displaying the second roll call to the second participant, the display indicating identifiers for the first and second participants and an indication that the first participant is speaking, wherein displaying the second roll call includes displaying a first graphical indication and a second graphical indication, wherein the first graphical indication is displayed on the second roll call near the first participant identifier to indicate that the first participant has been authenticated, and wherein the second graphical indication is displayed on the second roll call near a second participant identifier to indicate that the second participant has been authenticated;

displaying the first roll call to the participants in the electronically facilitated conference;

receiving, by a second computerized roll attendant, indications of the first participant and the second participant participating in the electronically facilitated conference, wherein the second computerized roll attendant is different from the first computerized roll attendant;

storing, by the second computerized roll attendant, the received indications of the first participant and the second participant in a list of conference participants stored by the second computerized roll attendant, wherein the list of conference participants stored by the second computerized roll attendant is available for retrieval by the first computerized roll attendant, and wherein the list comprises a second roll call;

receiving a message with an indication of a third participant joining the electronically facilitated conference;

updating, by the first computerized roll attendant, the first roll call to add the third participant;

notifying, by the first computerized roll attendant, the first and second participants that the third participant has joined the electronically facilitated conference;

updating, by the second computerized roll attendant, the second roll call by the second computerized roll attendant to add the third participant;

receiving, by the first computerized roll attendant, an indication of the third participant departing the electronically facilitated conference;

receiving, by the second computerized roll attendant, an indication of the third participant departing the electronically facilitated conference;

displaying the second roll call to the second participant, the display indicating identifiers for the first and second participants and an indication that the first participant is speaking; and notifying, by the first computerized roll attendant, the first and second participants that the third participant has departed the electronically facilitated conference.

8. The computer-readable storage device of claim 7, further comprising determining whether one of the participants is speaking and, when a participant is speaking, identifying in the displayed roll call the speaking participant.

9. The computer-readable storage device of claim 7 wherein the graphical indication is an icon.

10. The computer-readable storage device of claim 7, further comprising:

prior to the third participant departing the electronically facilitated conference, identifying that the third participant is employing a conventional telephone; and indicating a telephone number associated with the third participant in the displayed roll call.

11. A system for providing a conference roll call for an electronically facilitated conference, the system comprising:

a first apparatus that enables the electronically facilitated conference, the first apparatus employed by a first participant in the electronically facilitated conference, the first participant identified by a first identifier, wherein the first identifier includes a first uniform resource identifier;

a second apparatus that enables the electronically facilitated conference, the second apparatus employed by a second participant in the electronically facilitated conference, the second participant identified by a second identifier wherein the second identifier includes a second uniform resource identifier;

a network that enables communications between the first apparatus and the second apparatus, the first apparatus and the second apparatus connected to the network;

a first computerized roll attendant connected to the network that:
  receives the first identifier and the second identifier;
  stores a first list of the first and second participants in the electronically facilitated conference, the first list of participants providing the roll call for the electronically facilitated conference;
  provides the roll call to the first and second participants;
  receives a message with an indication of a third participant joining the electronically facilitated conference;
  updates the roll call to add the third participant;
  receives an indication of the third participant departing the electronically facilitated conference;
  receives a first verifiable digital signature associated with the first participant;
  authenticates the first participant based on the first verifiable digital signature and the first uniform resource identifier;
  receives a second verifiable digital signature associated with the second participant;
  authenticates the second participant based on the second verifiable digital signature and the second uniform resource identifier;
  notifies the first and second participants that the third participant has joined the electronically facilitated conference; and a second computerized roll attendant connected to the network, wherein the second computerized roll attendant is different from the first computerized roll attendant, and wherein the second computerized roll attendant:
  receives the first identifier and the second identifier;
  stores the first identifier and the second identifier in a second list of participants, wherein the second list of participants is available for retrieval by the first computerized roll attendant;
  receives the third identifier; and
  updates the second list of participants to add the third identifier; and a display unit associated with the first apparatus that displays information associated with identifiers of the participants, the displayed information including the roll call, provided by the first computerized roll attendant, of the participants in the electronically facilitated conference, wherein display of the roll call includes displaying a first graphical indication near the identifier of the first participant to indicate the first participant has been authenticated, and further wherein display of the roll call includes displaying a second graphical indication near the identifier of the second participant to indicate that the second participant has been authenticated.

12. The system of claim 11, such that the first apparatus comprises a computing device executing a Voice over Internet Protocol application.

13. The system of claim 12, such that the second apparatus comprises a computing device executing a Voice over Internet Protocol application.

14. The system of claim 12, such that the second apparatus comprises a Voice over Internet Protocol telephone.

15. The system of claim 11, such that the second apparatus comprises a conventional telephone and the first apparatus displays a telephone number associated with the second participant.

16. The system of claim 11, such that the first computerized roll attendant provides an indication that the first participant is speaking.

17. The system of claim 11, such that the second computerized roll attendant is a multipoint control unit.

18. The system of claim 11, wherein the second apparatus comprises a mobile phone and the first apparatus displays a telephone number associated with the second participant.

19. The system of claim 11, wherein the first computerized roll attendant is a mobile device.

20. The system of claim 11, wherein the second computerized roll attendant is a multipoint control unit.

* * * * *